United States Patent [19]
Ohta

[11] Patent Number: 5,261,070
[45] Date of Patent: Nov. 9, 1993

[54] METHOD AND APPARATUS FOR FORMING UNIQUE USER IDENTIFICATION DATA AT REMOTE TERMINAL FOR SECURE TRANSMISSION OF DATA FROM HOST TERMINAL

[75] Inventor: Junichi Ohta, Tokyo, Japan

[73] Assignee: Meiji Milk Product Co., Ltd., Tokyo, Japan

[21] Appl. No.: 587,615

[22] Filed: Sep. 20, 1990

Related U.S. Application Data

[63] Continuation of Ser. No. 76,286, Jul. 22, 1987, abandoned.

[30] Foreign Application Priority Data

Jul. 24, 1986 [JP] Japan .................... 61-172887

[51] Int. Cl.⁵ ............................................. G06F 12/14
[52] U.S. Cl. ......................... 395/425; 364/228.4; 364/944.5; 364/286.4; 364/286.5; 364/DIG. 1; 395/400
[58] Field of Search ........... 340/825.3, 825.31, 825.34; 380/3, 4, 23, 24, 25, 26, 42, 43, 44; 395/425, 200, 400; 364/200 MS File, 900 MS File

[56] References Cited

U.S. PATENT DOCUMENTS

| | | | |
|---|---|---|---|
| 3,798,605 | 3/1974 | Feistel | 364/200 |
| 4,011,545 | 3/1977 | Nadir | 364/200 |
| 4,218,738 | 8/1980 | Matyas et al. | 364/200 |
| 4,238,854 | 12/1980 | Ehrsam | 364/200 |
| 4,255,811 | 3/1981 | Adler | 375/2 |
| 4,281,215 | 7/1981 | Atalla | 340/825.34 |
| 4,283,599 | 8/1981 | Atalla | 235/379 |
| 4,304,961 | 12/1981 | Campbell, Jr. | 380/23 |
| 4,310,720 | 1/1982 | Check, Jr. | 340/825.31 |
| 4,349,695 | 9/1982 | Morgan et al. | 340/825.34 |
| 4,386,416 | 5/1983 | Giltner et al. | 364/900 |
| 4,450,535 | 5/1984 | de Pommery | 364/900 |
| 4,531,023 | 7/1985 | Levine | 364/900 |
| 4,630,201 | 12/1986 | White | 380/24 |
| 4,652,990 | 3/1987 | Pailen | 364/200 |
| 4,733,345 | 3/1988 | Anderson | 364/200 |
| 4,757,468 | 7/1988 | Domenik et al. | 364/200 |
| 4,779,224 | 10/1988 | Moseley | 364/900 |
| 4,780,905 | 10/1988 | Cruts et al. | 380/44 |
| 4,791,669 | 12/1988 | Kage | 380/46 |
| 4,868,045 | 9/1989 | Horiki | 428/314.4 |

FOREIGN PATENT DOCUMENTS 1189925 2/1985 Canada .
WO83/01881 5/1983 PCT Int'l Appl. .

Primary Examiner—Lawrence E. Anderson
Assistant Examiner—Eric Coleman
Attorney, Agent, or Firm—Lewis H. Eslinger; Jay H. Maioli

[57] ABSTRACT

The present invention relates to a method and apparatus to determine whether a user is authorized to utilize a data communication network, and more particularly a terminal machine in the network. Data having a predetermined number of bits are read out from a relatively large random number memory, containing previously stored data, by using key data to address said bits at the terminal machine. The addressed data are used as new key data and data each having a predetermined number of bits are repeatedly read from the data in the random number memory to form identification data on the basis of the old and new key data in each cycle. In such manner, there are formed identification data unequivocally determined in accordance with the key data and having high security or confidentiality.

3 Claims, 3 Drawing Sheets

METHOD AND APPARATUS FOR FORMING UNIQUE USER IDENTIFICATION DATA AT REMOTE TERMINAL FOR SECURE TRANSMISSION OF DATA FROM HOST TERMINAL

This is a continuation of application Ser. No. 07/076,286, filed July 22, 1987 now abandoned.

BACKGROUND OF THE INVENTION

1. Field of the Invention

This invention relates to a method and an apparatus for forming identification data for demonstrating authenticity of the user of a peripheral device in making data communications with other peripheral devices or computer centers in the data communication network including a plurality of peripheral devices for data communication and computer centers.

2. Description of the Prior Art

In a data communication network including a plurality of peripheral device for data communication and a computer center or centers in general, it is necessary to check that the user is authorized to use the network and to cipher the data transmitted through the communication network, in order to enable only the authorized user to have access to the host machine to assure data security such as data confidentiality.

Heretofore, in checking that the user is an authorized user, identification data allocated to each user and the password optionally designated by the user are registered at a host machine. The user transmits the identification data and the password from the terminal machine to the host machine and the identification data and the password received at the host machine are compared with the identification data and the password registered at the host machine.

For example, in a cash dispenser making use of an on-line system of banking facilities, an ID card such as a magnetic card or an IC card with prerecorded identification data of a user is utilized to demonstrate that the user is an authorized user of a bank account. The method of identifying a person by an IC card is shown for example in the Japanese Laid-open Patent Publication No. 146361/1985.

On the other hand, data transmitted through a communication network are protected by ciphering the data on the communication network by a ciphering device of the DES or RSA system provided on the communication network.

It is noted that, in the data communication network in general, the password optionally designated by the user is apt to be decoded and, once the ID card is forged or stolen, it becomes impossible to identify the authorized user, so that the chance that the host machine is illegally accessed is increased. On the other hand, the identification data allocated to the user are formed by a dedicated data processing device at the time of the preparation of the ID card or at a host machine of the data communication network. There is the risk of theft of the data processing device, the identification data formation algorithm at the host machine or of the identification data per se. Thus a demand has been raised for evolving the method and the apparatus for forming the identification data of high data security or confidentiality.

OBJECT AND SUMMARY OF THE INVENTION

It is a principal object of the present invention to provide a method and an apparatus for forming identification data of improved data security.

It is another object of the present invention to prevent unauthorized accessing of the host machine in the data communication network and to realize highly reliable data security functions.

It is a further object of the present invention to provide a method and an apparatus for forming identification data of higher data security that may be implemented with a simpler design and at lower costs.

In accordance with the present invention, there is provided a method for forming identification data comprising reading out data of a prescribed number of bits from random number data on the basis of key data, the random number data being formed of a large number of bits and previously stored in a memory; forming new key data at least a part of which is formed by the data of a prescribed number of bits read out from the random number data, reading out data of a prescribed number of bits from the random number data on the basis of the new key data; the read-out operation being repeatedly performed; and forming identification data from the data of the prescribed number of bits repeatedly read out from the random number data formed of a large number of bits.

In accordance with the present invention there is also provided memory in which random number data of a large number of bits are previously stored; address forming unit for forming addresses for reading out data of a prescribed number of bits from the memory on the basis of key data; and a data read-out unit for transmitting data of a prescribed number of bits read out from the memory to the address forming unit for at least a part of new key data; the identification data being formed from data each consisting of a prescribed number of bits read out from the memory to said address forming large number of bits.

In the method and the apparatus for forming identification data in accordance with the present invention, data of a predetermined number of bits read out on the basis of key data from data of a large number of bits previously stored in a terminal machine in a data communication network are used for at least a portion of new key data and the data each being of a predetermined number of bits are repeatedly read out from the aforementioned random number data of a large number of bits for forming identification data. In such manner, there are obtained identification data of extremely high data security that are unequivocally defined with respect to the key data by the algorithm of forming the identification data at the terminal machine and the algorithm of forming the key data at the host machine. On the other hand, when the identification data formed at the terminal machine from the random number data on the basis of the key data are registered at the host machine, it may be checked at the host machine that the user is an authorized user by simply having the key data proper to each terminal machine controlled or managed at the host machine. In addition, when the identification data formed from the random number data at the terminal machine on the basis of the received key data are combined into transmitted data at the host machine, the transmitted data itself is protected, so that, in case of leakage of the transmitted data, an authorized user may optionally duplicate the received data without the contents of the transmitted data being known by third parties.

BRIEF DESCRIPTION OF THE INVENTION

DESCRIPTION OF THE PREFERRED EMBODIMENTS

A preferred embodiment of a data communication network making use of the method and the apparatus for forming identification data according to the present invention will be hereafter described by referring to the accompanying drawings.

Figure 1:
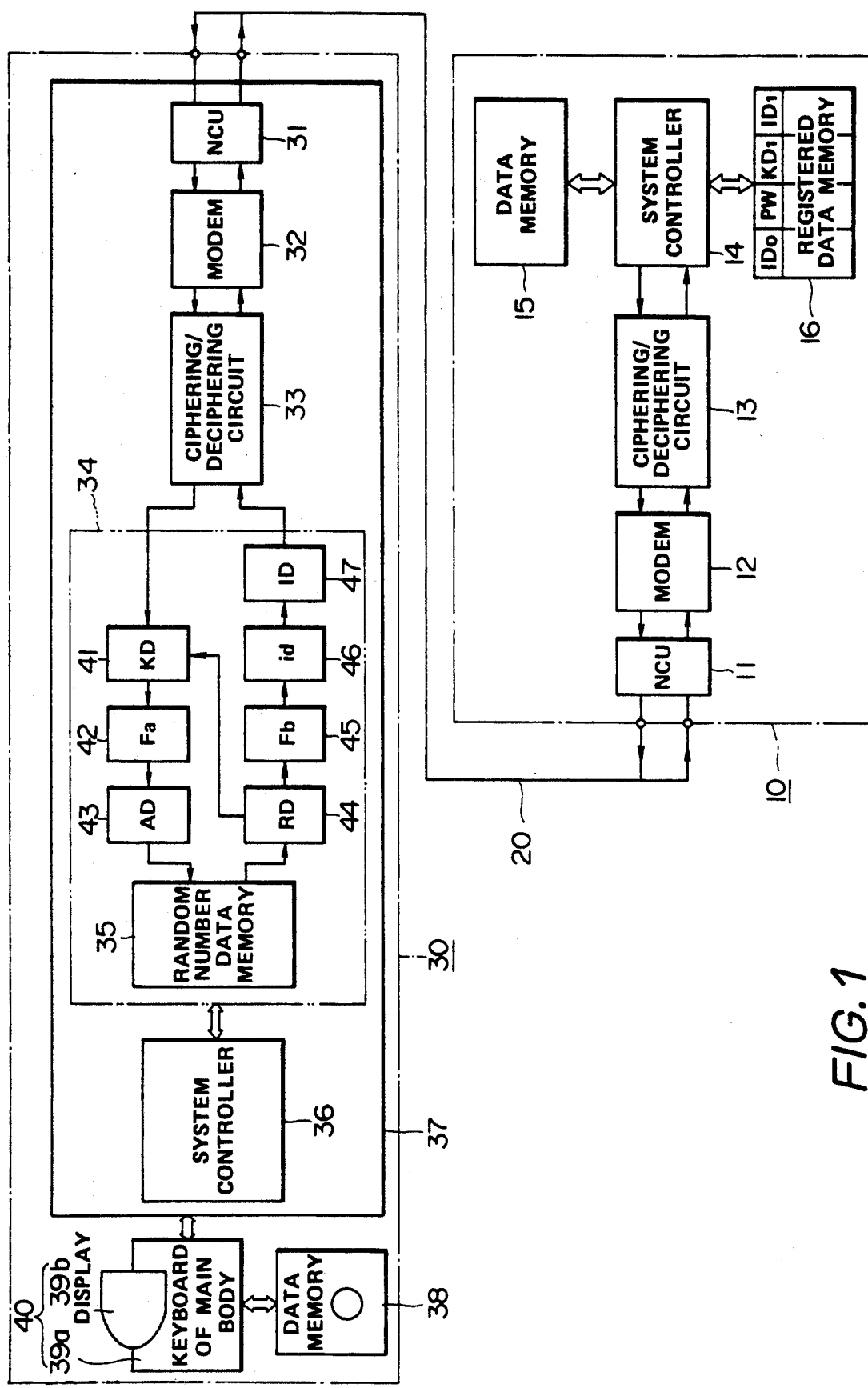
FIG. 1 is a block diagram showing a first embodiment of the present invention as applied to the data communication network.

In FIG. 1, there is illustrated in a block view a first embodiment according to the present invention. In the first embodiment shown in FIG. 1, a host machine 10 of the data communication network is formed by a general network control unit (NCU) 11, a modulation/demodulation unit (MODEM) 12, a ciphering/deciphering circuit 13 and a system controller 14 necessary for supplying and receiving data to or from a plurality of terminal machines 30, a data memory 15 for storing data required by users of the data communication network and a registered data memory 16 necessary for storing registered data necessary for identifying the terminal machine 30.

Each terminal machine 30 is formed by a communication adapter 37 comprised of a network control unit (NCU) 31, a modulation/demodulation unit (MODEM) 32, a ciphering/deciphering circuit 33 corresponding to those of the host machine 10, an arithmetic operating and processing unit 34 for formation of identification data, a random number data memory 35 consisting of a read-only memory (ROM) with previously written random number data of, for example, 32 K bytes, similarly for forming identification data and a system controller, 36 controlling the arithmetic operating and processing unit including the random number data memory. The remote terminal 30 also includes a data terminal 40 comprised of a data memory 38 for storage of data transmitted from the host machine 10, a keyboard 39a for inputting operating data, and a display 39b.

In the present first embodiment, the arithmetic operating and processing unit 34 for formation of the identification data is formed by a first register 41 for transient storage of key data (KD), a first irreversible function or Fa processing unit 42 for subjecting the key data (KD) stored in the register 41 to irreversible function processing, reading the thus processed data and forming address data, AD, a second register 43 for transient storage of read-out address data AD formed in the Fa processing unit 42, a third register 44 for transiently storing data RD read out from a storage location of the random number memory 35 designated by the address data AD stored in the register 43, a second irreversible function or Fb processing unit 45 for subjecting the data RD stored in the register 44 to irreversible function processing, a fourth register 46 for transiently storing data id formed in the irreversible function or Fb processing unit 45 and a transmission buffer 47 for transiently storing identification data or ID data formed in the operating and processing unit 34. It is noted herein that semiconductor RAMs may be used as the register 41, 43, 44 or 46 or as the transmission buffer 47, while so-called programmable array logics or PALs may be used as the irreversible function processing unit 42, 45 and a semiconductor ROM may be used as the random number memory 35.

In the data communication network of the present embodiment, when making user registration for utilizing a data base, an ID number $ID_0$ allocated to each terminal machine 30 at the host machine 10, a password PW arbitrarily designated by the user and a key data $KD_1$ randomly produced for each ID number by the host machine 10, are registered in a registered data memory 16 of the host machine 10. As the user inputs his ID number $ID_0$ and his password PW in the terminal machine 30 and accesses the host machine 10, the identification data $ID_1$ may be registered in the registered data memory 16 in the following manner.

That is, in registering the identification data $ID_1$, the user operates the terminal machine 30 to transmit the ID number $ID_0$ and the password PW to access the host machine 10. The host machine 10 acknowledges that the received ID number $ID_0$ and password PW coincide with the ID number $ID_0$ and password PW registered in the registered data memory 16 and transmits the key data $KD_1$ allocated to each terminal machine 30 in association with the ID number $ID_0$ to the terminal machine 30. The terminal machine 30 fetches the received key data $KD_1$ to the operating and processing unit 34 to form identification data $ID_1$ of a predetermined length on the basis of the key data $KD_1$, which identification data $ID_1$ is retransmitted to the host machine 10. The host machine 10 registers the received identification data $ID_1$ in the registered data memory 16.

The arithmetic operating and processing unit 34 of the terminal machine 30 forms and transmits the identification data $ID_1$ in the following manner.

On receiving the aforementioned key data $KD_1$, the arithmetic operating and processing unit 34 fetches the key data $KD_1$ of, for example, 16 bits, to the first register 41, forms read-out address data AD in the Fa processing unit 42 using the key data $KD_1$ as the parameter and writes the read-out address data AD in the second register 43. The unit 34 then reads out a 1-byte data RD from, for example, 32K-byte random number data previously written in the random number data memory 35 at a storage location thereof designated by the aforementioned read-out address data AD, and writes the read-out 1-byte data, for example, in the third register 44. The unit 34 then forms a 1-byte identification data id in the Fb processing unit 45 using the data RD written in the register 44 as the parameter and writes the formed identification data id in the fourth register 46. The aforementioned identification data id are transmitted from the fourth register 46 to the transmission buffer 47 where they are stored. The unit 34 then moves the lower 8 bits of the key data $KD_1$ stored in the first register 41 to the position of the upper 8 bit position while moving the aforementioned 1-byte data RD stored in the third register 44 to the first register 41 as the lower 8 bit data to form new key data KD. In the present embodiment, the aforementioned arithmetic operation and processing is repeated 128 times, for example, using newly formed key data KD each time to form the 128-byte identification data $ID_1$ in the transmission buffer 47, which data are transmitted from the transmission buffer 47 to the host machine 1 0 through the ciphering/deciphering circuit 33, MODEM 32 and NCU 31. The length L of the identification data ID, (in the present embodiment, it is equivalent to the number of times of repetition of the arithmetic operation) is not limited to 128 as described above and may be set optionally. Alternatively, the numerical data of the length L of the identification data or the data of the number of times of the repetitive operation in the present embodiment may be transmitted to the terminal machine 30 so that the length of the identification data $ID_1$ will be determined in the host machine.

An exemplary operation of forming identification data $ID_1$ at the terminal machine 30 will be described by referring to the flow chart of FIG. 2. In this figure, it is assumed that the length L of the identification data and the key data $KD_1$ are transmitted to the terminal machine 30, and that the key data $KD_1$ is formed by 2 bytes or 16 bits, with the upper and lower 8 bits being indicated by $K_H$ and $K_L$ respectively.

Figure 2:
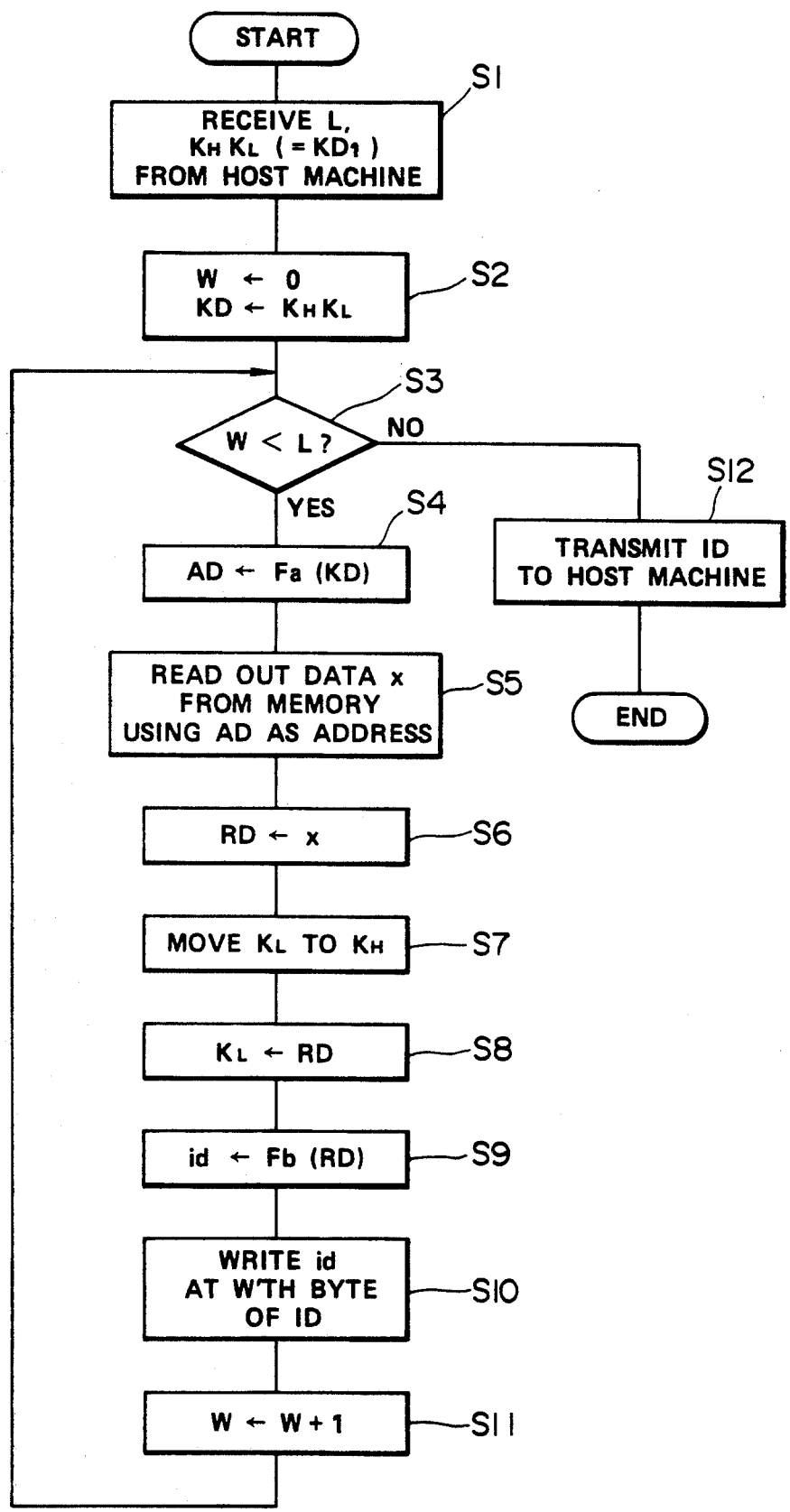
FIG. 2 is a flow chart showing the essential operation of the first embodiment.

At the first step $S_1$ of FIG. 2, the length L of the identification data transmitted from the host machine 10 and the key data $KD_1$ (with the upper 8 bits of $K_H$ and the lower 8 bits of $K_L$) are received. At the next step S2, the loop control variable W is set to 0 and the aforementioned data ($K_H$, $K_L$) are stored as the usual key data KD in the register 41. At the next step S3, it is determined whether the aforementioned loop control variable W is less than L. If affirmative, control proceeds to the next step S4, the key data KD in the register 41 are transmitted to the Fa processing unit where they are processed to produce read-out address data AD which are written in the register 43. At the next step S5, the 1-byte data x of the 32K byte random number data previously written in the random number data memory 35 are read out at a memory location designated by the read-out address data AD. At the next step S6, the data x are written as the aforementioned data RD in the register 44. At the next step S7, the lower 8 bits $K_L$ of the key data KD stored in the register 41 are moved to the position of the upper 8 bits $K_H$. At the step S8, the aforementioned 1-byte data RD stored in the register 44 are moved to the register 41 as the lower 8-bit $K_L$ data to form new key data KD. At the next step S9, the data RD written in the register 44 are transmitted to the Fb processing unit 45 where they are processed to produce one-byte data id of the L-byte identification data, which data id is written into the register 46. At the next step S10, the one-byte data id is written into the W th byte in the storage area of the L-byte identification data ID provided in the transmission buffer 47. At the next step S11, the loop control variable W is incremented (W=W+1), after which control is resumed to step S3. After the aforementioned operational sequence is repeated L times and if then the result of decision at the step S3 is NO, control proceeds to step S12, where the L-byte identification data ID stored in the transmission buffer 47 are transmitted to the host machine 10. It is noted herein that the identification data associated with the aforementioned key data $KD_1$ are indicated as $ID_1$.

In this manner, the aforementioned identification data $ID_1$ retransmitted from the terminal machine 30 are registered at the registered data memory 16 of the host machine 10, in association with the key data $KD_1$ allotted to the terminal machine 30. Then, each time the host machine is accessed by the terminal machine 30 by the ID number $ID_0$ and the password PW, the host machine 10 acknowledges the coincidence between these ID numbers. The host machine 10 then transmits the key data $KD_1$ and acknowledges the coincidence between the identification data $ID_1$ returned from the terminal machine 30 and the identification data $ID_1$ stored in the registered data memory 16 to confirm that the user is an authorized user.

Should the key data $KD_1$ registered at the host machine 10 be leaked to an unauthorized third party, the host machine 10 may alter the key data $KD_1$ and generate identification data $ID_1$ associated with new key data $KD_1$ by using the aforementioned algorithm of generating initial identification data for re-registration of the new identification data.

In the present embodiment, when the information required by the user is read out from the data memory 15 and transmitted from the host machine 10 to the terminal machine 30, the host machine 10 first generates disposable or nonce key data $KD_2$ and transmits these data to the terminal machine 30 each time the information is transmitted. The host machine 10 then causes the arithmetic operating and processing unit 34 to form new n-byte identification data $ID_2$ from the random number data by using the same artifice as that used for forming the identification data $ID_1$, and then causes these data $ID_2$ to be retransmitted to the machine 10. The host machine 10 then reads out the information requested by the user from the data memory 15, incorporates the received identification data $ID_2$ and the aforementioned key data $KD_2$ into the information read-out from the data memory 15 and transmits the resulting combined data to the terminal machine 30.

The terminal machine 30 writes the received data, that is, the information into which are combined the identification data $ID_2$ and the key data $KD_2$, into the data memory 38. When the user uses the information written into the data memory 38, the key data $KD_2$ combined into the information is transmitted to the arithmetic operating and processing unit 34, while the identification data $ID_2$ generated by the aforementioned algorithm of forming the identification data are re-transmitted to a data terminal 40. The data terminal 40 proceeds to compare the identification data $ID_2$ combined into the information with the re-transmitted data $ID_2$. Unless these data are coincident with each other, the key lock remains engaged to inhibit the use of the received data. In other words, any one other than the one authorized to use the terminal machine 30 having received the data cannot use the received data.

It is noted that, by using floppy disks as the data memory 38, the authorized user may optionally produce a duplicate disk as a backup of the disk on which are recorded the received data. However, the information cannot be used by any one other than the authorized user.

In the data communication network of the present embodiment, the data composed of a predetermined number of bits repeatedly read out from random number data composed of a number of a number of bits previously stored in a terminal machine on the basis of key data are used as new key data, thereby forming identification data of extremely high security unequivocally determined in accordance with different key data afforded by the host machine to the respective terminals, these identification data being user-registered at the host machine. Thus it is only necessary to control or manage the key data proper to the respective terminals to identify the authorized user securely and positively. Should key data be leaked to an unauthorized third party, it is only necessary to alter the key data of the host machine in order to provide for information security without the necessity of changing the hardware of the terminal machine. When there are a plurality of host machines, it is only necessary to separately control or manage the key data to be afforded to the terminal machines registered as the users at the host machines in order to identify the users reliably by using the same hardware. When the same communication adapter is used by plural users, it is only necessary for the host machine to control or manage key data and identification data. In addition, since the identification data formed at the terminal machines on the basis of the key data are combined at the host machine into the data to be transmitted from the host machine, the received data per se are protected in such a manner that only the terminal machines having the aforementioned identification data formation algorithm can utilize the contents of the received data. Thus, in case of leakage of the received data, the received data can be optionally duplicated by the authorized user without the contents thereof being known by third parties, so that there may be realized a data communication network that is most suitable for on-line delivery of the software by making use of the communication network.

Figure 3:
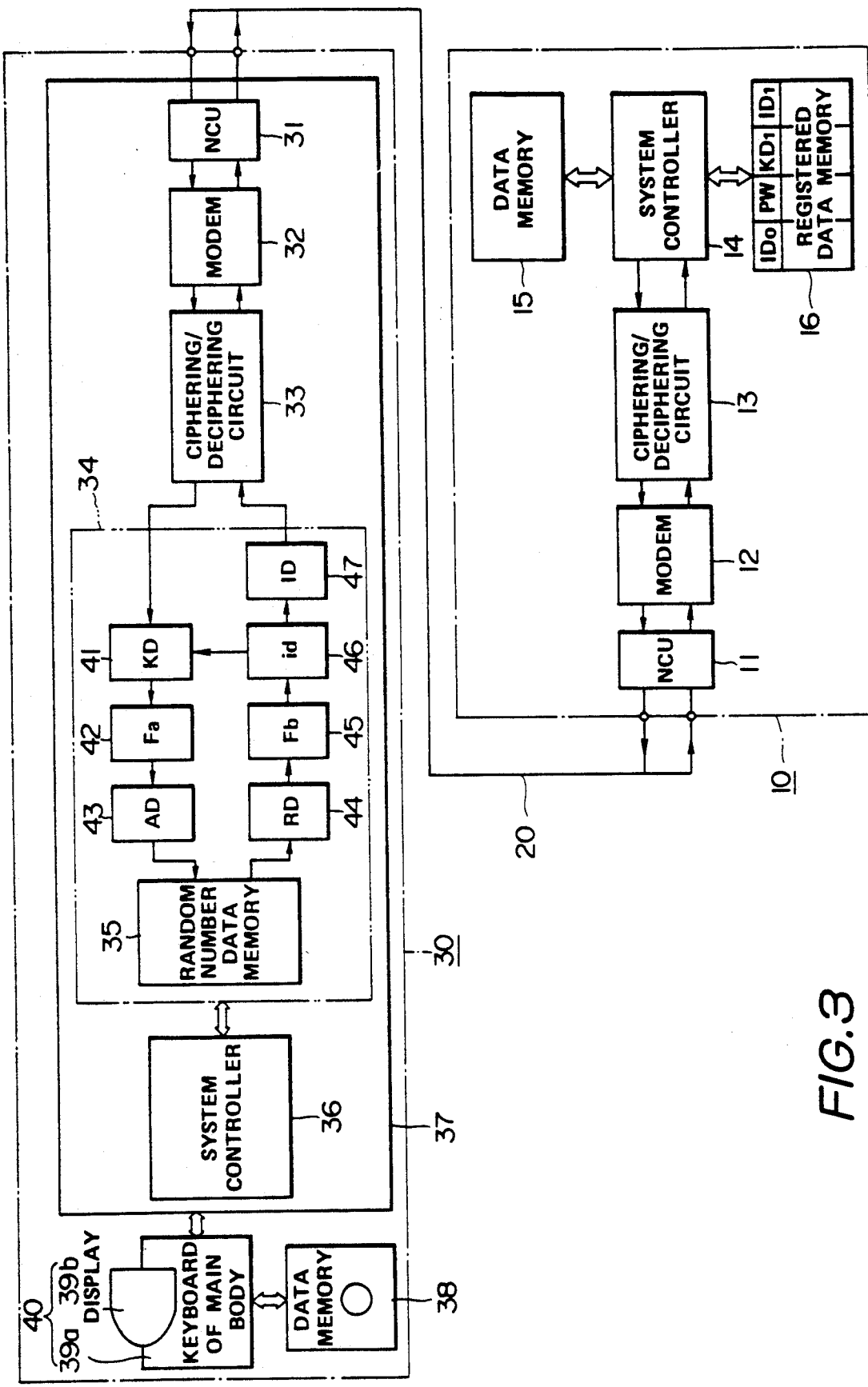
FIG. 3 is a block diagram showing a second embodiment of the present invention.

The present invention is not limited to the above described embodiments. For example, instead of the 1-byte data RD from the third register 44, the 1-byte data id from the fourth register 46 may be transmitted to the first register 41 as the data of the lower 8 bits $K_L$ of the new key data, as in the second embodiment shown in FIG. 3. The arrangement and the operation of the second embodiment are otherwise the same as that of the above described first embodiment so that parts or components of FIG. 3 corresponding to those of FIG. 1 are indicated by the same numerals and the corresponding description is omitted. It is to be noted that various changes can also be made without departing from the scope of the invention. For example, the number of times of repetition of the aforementioned arithmetic operation and processing may be different from the length L of the key data KD.

What is claimed is:

1. A method for forming identification data for use in a computer system including a host machine and a user terminal machine, comprising the steps of:

transmitting to the user terminal machine from the host machine a number L representing a length of the identification data and key data in response to a user entering a password in the user terminal machine;

reading out random number data having a prescribed number of bits equal to a number of bits of said key data from a random number memory in the user terminal machine by addressing said random number memory using said key data, said random number memory having previously stored therein a relatively large number of bits compared to said prescribed number, said large number being within a range to permit use as random number data, and said random number data being read out from said random number memory forming a portion equal to 1/L of the identification data;

generating new key data at the user terminal machine, at least a part of said new key data being formed by said portion of identification data having said prescribed number of bits read out from said random number memory;

reading out, from said random number memory, new identification data having said prescribed number of bits from said random number data containing a relatively large number of bits by addressing said random number memory using said new key data; and repeatedly performing a number of times equal to said number L the operation of reading out the new data from said random number memory by addressing said random number with successive new key data and forming identification data having a length given by said number L times said prescribed number of bits; and transmitting said identification data having a length given by said number L times said prescribed number of bits for storage in said host machine to subsequently identify said user terminal machine.

2. A method according to claim 1 further comprising the step of subjecting said key data and each new key data to an irreversible function processing to form address data for addressing said random number memory.

3. A method according to claim 1 including the further step of incorporating said identification data with said new key data in the host machine for subsequent transmission to the user terminal machine.

* * * * *

UNITED STATES PATENT AND TRADEMARK OFFICE
CERTIFICATE OF CORRECTION

PATENT NO. : 5,261,070
DATED : November 9, 1993
INVENTOR(S) : Junichi Ohta

It is certified that error appears in the above-indentified patent and that said Letters Patent is hereby corrected as shown below:

```
Col. 2, line 31, after "large" delete ","
        lines 39 & 40, change "memory to said address
        forming" to --random number data of a--
Col. 3, line 27, change "and" to --or--
        line 29, after "communication" delete "."
        line 42, after "controller" delete ","
        line 47, "transmitted" should continue on line 46
Col. 5, line 36, after "S6", change "." to --,--
```

In the Claims:

Col. 8, line 30, after "number" insert --memory--

Signed and Sealed this

Eighteenth Day of July, 1995

Attest:

BRUCE LEHMAN

Attesting Officer

Commissioner of Patents and Trademarks